W. A. TITUS.
OUTLET BOX.
APPLICATION FILED JAN. 22, 1917.
1,333,003.
Patented Mar. 9, 1920.
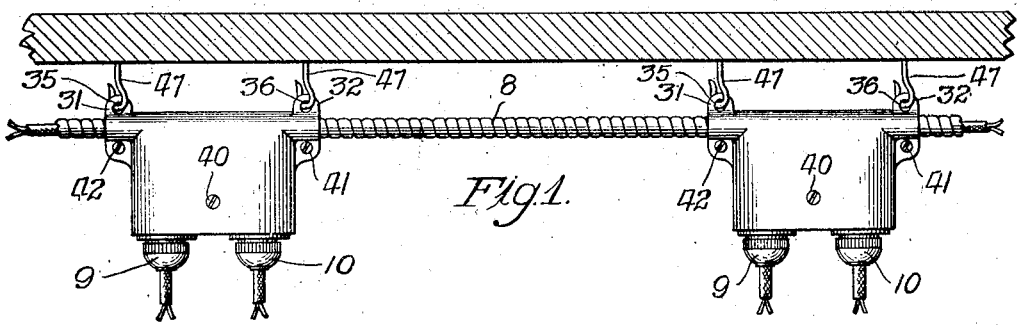
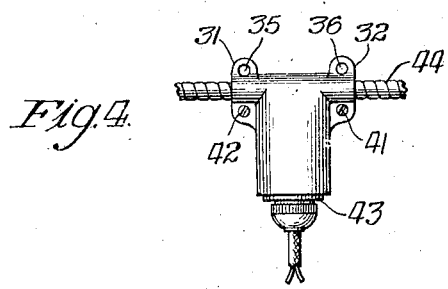
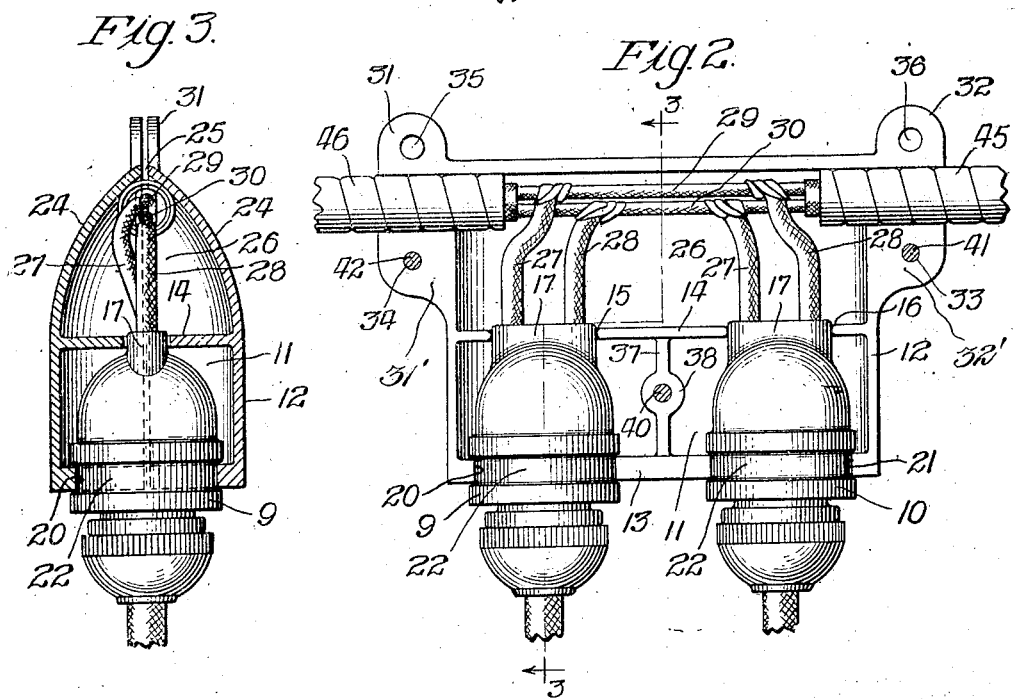
Inventor
William A. Titus
by *[signature]*, Atty.

UNITED STATES PATENT OFFICE.

WILLIAM A. TITUS, OF CHICAGO, ILLINOIS, ASSIGNOR TO WESTERN ELECTRIC COMPANY, INCORPORATED, OF NEW YORK, N. Y., A CORPORATION OF NEW YORK.

OUTLET-BOX.

1,333,003.

Specification of Letters Patent.

Patented Mar. 9, 1920.

Application filed January 22, 1917. Serial No. 143,700.

*To all whom it may concern:*

Be it known that I, WILLIAM A. TITUS, a citizen of the United States, residing at Chicago, in the county of Cook and State of Illinois, have invented certain new and useful Improvements in Outlet-Boxes, of which the following is a full, clear, concise, and exact description.

This invention relates to wiring fixtures, and more particularly to outlet boxes for use in connection with the wiring of power circuits.

The object of this invention is to provide an outlet box of convenient construction which may be readily applied to power leads for the purpose of extending taps from said power leads to any desired position for the convenience of workmen, and in which the current carrying conductors are completely incased in a metallic housing to absolutely nsure against the dangers from short circuits and the like and the consequent fire risks, and which also may be readily disconnected from the power leads without destruction of the parts.

In accordance with the general features of this invention there is provided a two-part outlet box which may be readily clamped to the power conductors by removable clamping means and which is provided with means to receive screw sockets or other convenient means of making temporary connections.

Preferably the device of this invention comprises two laterally separable members adapted to be clamped together by any suitable means and provided with walls and projecting portions which are adapted when the members are clamped together to form holding means for securing the outlet box to the conductors and for retaining the socket connectors from longitudinal, lateral, and rotary movement.

These features may be attained by providing chamber portions in the two members of the outlet box, one of which, when the members are clamped together, is adapted to engage and be clamped with the power conductors, the other of which forms a receptacle for the connecting sockets adapted to hold said sockets against rotation and against longitudinal movement.

As a further feature of this invention, means are provided on the two members of the outlet box for receiving suspending members.

With these and other features in view, the invention consists of the improved means hereinafter disclosed and pointed out in the appended claims.

The invention is illustrated in the accompanying figures in which:

Figure 1 shows two outlet boxes connected in a circuit and the preferred method of suspension;

Fig. 2 is a front elevation of the interior of one-half of the outlet box with the wire, conduit, and sockets in place;

Fig. 3 is a section on the plane 3—3 of Fig. 2 of a complete outlet box, the socket and connections being left in elevation, and Fig. 4 shows a form of outlet box used when it is desired to install but one socket.

The improved form of outlet box herein described can be readily designed to accommodate a single socket, as illustrated in Fig. 4, or may be designed to accommodate a plurality of sockets, the design when two sockets are desired being illustrated in Figs. 1 and 2. The outlet box consists of two similar metallic parts constituting a right and left unit which may be either cast, stamped, or formed and which when brought together and properly alined constitute a metallic housing fitted with suitable openings for holding and clamping into position the wire carrying conduit 8 and the sockets 9 and 10. Each half of the housing is equipped with a lower chamber 11 which is bounded by the outer wall 12, each end of which is curved inwardly and between which ends extend the bottom wall 13 of the housing and the transverse rib 14. The rib 14 acts as a strengthening member for the housing and also serves as a means for preventing rotary movement of the socket when said socket has been clamped between the two parts which constitute the complete housing or outlet box. For this purpose the rib 14 is cut out to form rectangular depressions at 15 and 16, said depressions having a depth so that they will receive substantially one-half of the thickness of the upwardly projecting lug 17 of the sockets 9 and 10. Consequently when the right and left members of the housing are brought together, the lugs 17 of the sockets are snugly fitted in the rectangular openings formed in the rib 14.

The lower wall 13 of each half of the housing is fitted with a semi-circular opening wherever it is desired to place a socket such as at 20 and 21. This semi-circular opening has a diameter substantially equal to the diameter of the groove 22 with which most commercial sockets are fitted and which ordinarily serves as a retaining means for the lamp guard. Consequently when the right and left members of an outlet box are placed in alinement, the semi-circular openings in the two parts will form a circular opening, the diameter of which is substantially equal to the diameter of the groove 22 in each socket, and as the bottom wall 13 of the outlet box has a thickness substantially equal to the width of said groove, said circular openings will prevent lateral and longitudinal movement of the socket when it is clamped between the right and left members of the housing. The side wall 24 of each half of the outlet box extending upwardly from the rib 14 is curved inwardly so that these walls will substantially meet at 25 when the two halves of the outlet box are placed in alinement and will form a chamber 26 for the reception of the socket conductors such as 27 and 28 and the conductors of the feed circuit 29 and 30.

Integral with and extending in a vertical direction from the outside wall of the conduit passage in the upper part of each half of the housing are the ears 31 and 32 on the upper side of the passage, and on the lower side the ears 31′ and 32′. The upper ears 31 and 32 are provided with holes 35 and 36, said holes being utilized to suspend the housing and circuit. The lower ears 31′ and 32′ are provided with holes 33 and 34, which holes are used for the reception of clamping screws which fasten the two halves of the housing together. The ears are fitted with semi-circular grooves of a diameter substantially equal to the diameter of the conductor carrying conduit, the upper quadrant of said grooves being curved similar to that portion of the wall 24 which lies between the same horizontal planes which bound said quadrant. Consequently when the right and left members of an outlet box are brought into alinement, the ears 31 and 32 form a circular opening into which the conduit will snugly fit and the extreme upper portion of the side wall 24 will also snugly fit the curvature of said conduit.

Extending between the lower wall 13 and the rib 14 in substantially the middle of the chamber 11 in each half of the housing is the rib 37 which is equipped with a boss 38 which is drilled in the left half of the housing and tapped in the right half for the reception of the clamping screw 40. In an outlet box designed for the reception of a plurality of sockets a clamping screw such as 40 is placed between each pair of sockets; but for outlet boxes which are to receive but a single socket, such as illustrated in Fig. 4, the clamping screw 40 is unnecessary, the clamping screws 41 and 42 in this case being sufficient to securely hold the socket 43 and the conductor carrying conduit 44.

The operation of installing the socket is exceedingly simple. Thus when the particular location of a socket which is to be installed has been determined, the protecting conduit is removed for a very short distance and the current carrying conductors such as 29 and 30, shown in Fig. 2, are tapped for the socket connections by removing the insulation and soldering the conductors leading from the socket to the current carrying conductors. The connection is then tapped in the usual way to prevent contact between the conductors and the wall of the outlet box. When the socket has been thus connected, the ends of the conduit 45 and 46, as shown in Fig. 2, are placed into the semicircular grooves in the ears 31 and 32 and the socket fitted in place between the bottom wall 13 and the rib 14 in one of the halves of the outlet box. The other half of the outlet box is then placed in position and in alinement with said first half and the clamping screws 40, 41, and 42 are placed in position and drawn up tightly. This will securely clamp the conduit and the sockets in place, and the outlet box can then be suspended by any suitable means, preferably by hooks such as 47, as shown in Fig. 1.

It will be quite obvious that when a circuit has thus been installed in a series of these outlet boxes, it is a very simple operation to either suspend or take down said circuit. Likewise it will be evident that the weight of the circuit is sustained by the conduit and the outlet box in combination with the clamping screws which join the outlet box to said conduit. The circuit when thus installed is inclosed in a complete metallic housing which conforms absolutely to the requirements of the underwriters. When it is desired to dismantle such a circuit the only operation necessary is the unhooking of the outlet boxes, and the complete circuit may then be rolled up and transported to the next place where it can be frequently used with a very few alterations, the distance allowed between sockets being substantially standard. This portable feature of the circuit necessarily involves a great saving of material as well as time.

Obviously the invention is not limited to the specific embodiment herein shown and described, but is capable of modification and other applications within the spirit and scope of the invention, as set forth in the appended claims.

What is claimed is:

1. An outlet box consisting of two sections adapted to be secured together, means carried by said sections adapted when said sections are secured together to secure said outlet box to power wires, a socket, and means formed integrally with and projecting inwardly from the inside walls of said sections to engage a portion of said socket to hold it against rotation.

2. An outlet box comprising two sections adapted to be secured together, said sections forming when secured together a power wire chamber and a socket chamber, means carried by said power wire chamber for securing said outlet box to power wires, and means formed integrally with and projecting from the outside wall of said power wire chamber for suspending said power wires and said outlet box.

3. An outlet box consisting of two similar parts which unite to form a socket receiving chamber and a power wire chamber, projections integral with the inside walls of said parts and provided with openings therein to receive the end of the socket to secure said socket against rotary movement, and means formed by the uniting of said sections with a channeled section of said socket to secure said socket against longitudinal and lateral movement.

4. An outlet box consisting of two sections adapted to be clamped together, said sections each forming one half of a power wire chamber and a socket chamber, said first chamber being adapted to receive socket wires which are connected to power wires carried therein, said first chamber also having a longitudinal passage on both sides of the upper part thereof formed by the clamping of said sections together, said second chamber having in the lower part thereof a vertical passage formed by the clamping of said sections together for the securing of a socket from lateral and longitudinal movement, projections on the inner walls of said sections provided with recesses which upon the clamping of said sections together form an opening through which the end of said socket extends and is securely locked against rotation, and lugs extending from the upper part of said sections for suspending said outlet box and said power wires.

5. An outlet box consisting of two chambers adapted to receive respectively a socket and the current carrying conductors two of the walls of said socket receiving chamber serving to positively position said socket, means integral with the wall of said conductor receiving chamber to positively position the conductor carrying conduit, and means integral with said last-mentioned means for suspending said box and conduit.

In witness whereof I hereunto subscribe my name this 10th day of Jan., A. D., 1917.

WILLIAM A. TITUS.